(12) United States Patent
Subramanian et al.

(10) Patent No.: US 10,684,843 B1
(45) Date of Patent: *Jun. 16, 2020

(54) FIRMWARE UPDATES USING UPDATED FIRMWARE FILES IN A DEDICATED FIRMWARE VOLUME

(71) Applicant: American Megatrends International, LLC, Norcross, GA (US)

(72) Inventors: Sey Subramanian, Suwanee, GA (US); Bejean David Mosher, Acworth, GA (US); Rodney Grant, Lithonia, GA (US)

(73) Assignee: American Megatrends International, LLC, Norcross, GA (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/718,862

(22) Filed: Sep. 28, 2017

(51) Int. Cl.
  *G06F 9/44* (2018.01)
  *G06F 8/65* (2018.01)
  *G06F 16/17* (2019.01)

(52) U.S. Cl.
  CPC ............ *G06F 8/65* (2013.01); *G06F 16/1734* (2019.01)

(58) Field of Classification Search
  CPC ............................... G06F 8/65; G06F 16/1734
  USPC ........................................................ 717/169
  See application file for complete search history.

(56) References Cited

U.S. PATENT DOCUMENTS

| | | | |
|---|---|---|---|
| 2006/0101092 A1* | 5/2006 | Ishida | ........................ G06F 8/71 |
| 2009/0024674 A1* | 1/2009 | Gallagher | ........... G06F 16/1873 |
| 2016/0321452 A1 | 11/2016 | Richardson | |
| 2017/0003956 A1* | 1/2017 | Chang | ..................... G06F 8/654 |

OTHER PUBLICATIONS

U.S. Appl. No. 15/718,935—Non Final Office Action dated Mar. 12, 2019, 33 pages.
U.S. Appl. No. 15/718,935—Final Office Action dated Sep. 16, 2019, 37 pages.

* cited by examiner

*Primary Examiner* — Anna C Deng
(74) *Attorney, Agent, or Firm* — Newport IP, LLC

(57) ABSTRACT

Technologies are disclosed herein for updating a firmware file system (FFS) file by preserving the original FFS file in its current firmware volume and then storing an updated version of the original FFS file in a firmware volume for updated FFS files. The updated FFS file may be stored in the firmware volume for updated FFS files referenced to the same FFS file identifier as the original FFS file. During boot-up of a system incorporating the updated firmware, the firmware volume for updated FFS files may be accessed to determine if an updated version of any FFS files are present. If updated FFS files are present, then those updated FFS files may be executed, rather than the original FFS files.

19 Claims, 6 Drawing Sheets

US 10,684,843 B1

FIRMWARE UPDATES USING UPDATED FIRMWARE FILES IN A DEDICATED FIRMWARE VOLUME

BACKGROUND

Many computers systems utilize firmware, such as a universal extensible firmware interface (UEFI) or basic input/output system (BIOS), when booting up the computer system. The firmware may perform various services during boot-up, after which the system may operate in runtime under the control of an operating system (O/S). The firmware is often stored on a non-volatile memory, such as non-volatile random access memory (NVRAM), of the computer system.

In some cases, a firmware, or components thereof, may need to be updated. For example, one or more components of firmware may be updated at some point after build time, when a computer system is first built and configured, such as by a system manufacturer. The NVRAM on which the firmware is stored may, in some cases, be erasable only in blocks, or otherwise predetermined segments of memory space. As a result, erasing and rewriting components of a firmware may entail erasing a section of memory that is greater in size than just the firmware components that are to be updated. This may pose difficulty in orchestrating the update of firmware components and/or files.

In addition to difficulty in updating firmware components and/or files stored on a NVRAM, if one or more firmware components and/or files are deleted, and then a problem is encountered in writing updated versions of those components and/or files, then the system may be rendered inoperable. Recovering from such an inoperable state may entail restoring the entirety of the firmware which, in some cases, may require a field and/or service technician. Alternatively, recovery from a failed firmware update may be possible by having a computing system with a redundant copy of the firmware.

Further still, if an updated firmware component and/or file is inoperable, incorrectly updated, or otherwise defective, the computer system may be rendered inoperative and/or unable to bootup. Recovery from such a state may entail additional hardware, personnel, and/or additional recovery steps.

It is with respect to these considerations and others that the disclosure made herein is provided.

SUMMARY

The technologies disclosed herein provide functionality for updating firmware file system (FFS) files, such as during build time or in the field. The FFS files may be updated by storing an updated version of an original FFS file in a new firmware volume. In other words, an original FFS file may be stored in a first firmware volume, and an updated version of that original FFS file may be stored in a second firmware volume, such as a firmware volume dedicated to storing updated FFS files. For example, an original FFS file may be stored in a "main firmware volume," or fv_main, as part of an original build of the system in which the firmware is incorporated, and a corresponding updated FFS file may be stored in an "update firmware volume," or fv_update, as part of a post-build (e.g., in-the-field) update. The updated FFS file may be stored in association with the same FFS file identifier, such as a globally unique identifier (GUID), as the original FFS file.

During boot-up, the system may determine if any of the FFS files in the first firmware volume (e.g., fv_main) are updated in the second firmware volume (e.g., fv_update). This may be determined by checking if an updated FFS file is stored in fv_update with the same identifier (e.g., GUID) as the original FFS file as stored in fv_main. If an updated FFS file is detected in fv_update, then the updated FFS file may be executed instead of the original FFS file. In this way, each of the FFS files may be checked to determine if there are updates, and when updated FFS files are detected, the updated files may be executed.

According to some example embodiments, after an FFS file has been updated, such as by storing the updated FFS file in fv_update associated with the same identifier as the original FFS file, the updated FFS file may not be launched upon the next reboot of the system on which the firmware resides. In other words, only known good FFS file updates may be launched. This may be implemented by having a listing of FFS file updates that are to be launched (e.g., a launch list) and those that are to be blocked (e.g., a black list). The launch list and/or the black list may be used to determine whether a particular FFS file update is to be executed when that FFS file update is detected.

After a FFS file has been updated, upon the next boot-up of the system, it may be detected that the updated FFS file is not indicated on either a launch list or a black list. At this point, the system may execute the updated FFS file and identify if the execution of the FFS file results in any errors. If no errors are encountered, then the identifier of the updated FFS file may be added to the launch list, and other FFS file updates may be tested. If, however, an error was detected with the execution of instructions of the updated FFS file, then the identifier of the updated FFS file may be added to the black list, and the system may be rebooted. In this way, in any subsequent reboot of the system, each and every updated FFS file identifier may be either on the launch list, indicating that the updated FFS file is to be executed, or on the black list, indicating that the original FFS file is to be executed.

The above-described subject matter may be implemented as a computer-controlled apparatus, a computer-implemented process, a computing system, or as an article of manufacture such as a non-transitory computer-readable storage medium. These and various other features will be understood from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
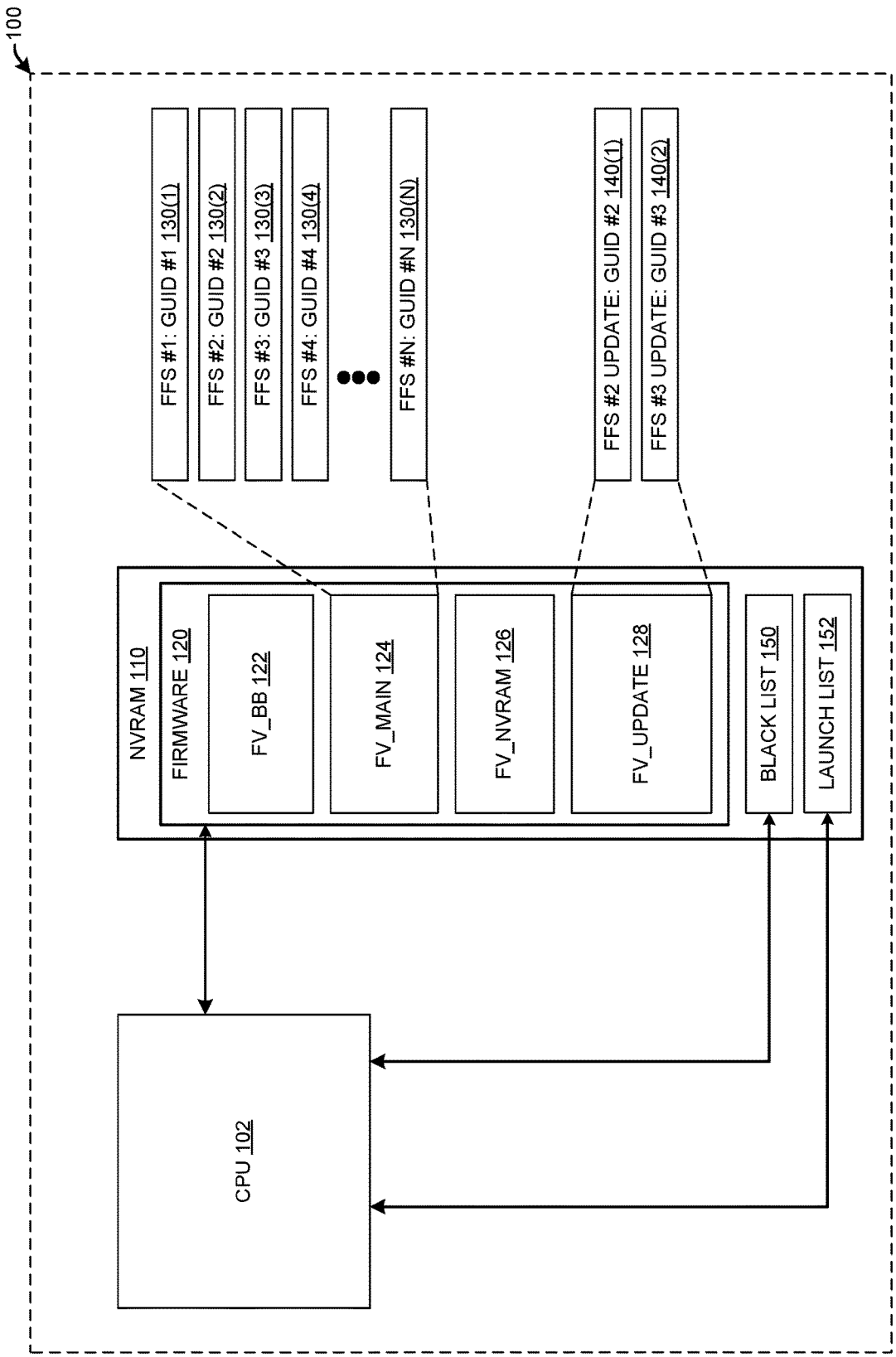
FIG. 1 is a block diagram showing example computer system with a firmware with an update firmware volume for storing updated firmware file system (FFS) files, according to example embodiments of the disclosure.

The following detailed description is directed to technologies for updating, such as during build-time or in-the-field, firmware on a computer system. According to example embodiments, individual firmware files system (FFS) files that are to be updated may be updated by storing the updated FFS files in an update firmware volume, without removing the original version of the FFS file to be updated from its firmware volume. For example, a plurality of FFS files may be stored in a main firmware volume (fv_main), and some of the plurality of FFS files in fv_main may be updated by storing corresponding updated FFS files in in an update firmware volume (fv_update) of the firmware. Thus, the original FFS files are retained in fv_main, while any updates to any of the FFS files are stored in fv_update.

When an updated FFS file is stored in a separate volume of the firmware, such as in fv_update, the updated FFS file may be associated with the same identifier as the original FFS file that may be stored in fv_main, according to some example embodiments. FFS files may be identified by a globally unique identifier (GUID), or any other suitable name or identifier. Thus, when an FFS file is updated in the fv_update, the updated FFS file may have the same GUID as the original FFS file stored in fv_main or other firmware volumes.

In some example embodiments, during boot-up, a computer system may check to determine if an FFS file that it is about to execute has been updated. This may be done by searching the fv_update to determine if the GUID of the FFS file that is to be executed has a corresponding updated FFS file, as stored in fv_update. If an FFS file with a matching GUID is found in the fv_update, then the computer system may execute the new updated FFS, as found in the fv_update, rather than the original FFS file in the fv_main.

In some cases, a firmware update may include updating a FFS file using a bad, corrupted, or otherwise inoperable updated FFS file. Such a corruption of the firmware, if not reversible, may render the computer system unbootable and/or inoperable without updating the firmware to a known good firmware, such as by reflashing a non-volatile random access memory (NVRAM) device on which the firmware is stored. According to example embodiments, a mechanism may be implemented where an updated FFS file may only be deployed after executing the updated FFS file and determining that no errors occur during boot-up of the computer system with the updated firmware FFS file(s).

When an updated FFS file is booted for the first time, the FFS file may be executed and it may be determined if any errors occur during the execution of the FFS file. If the updated FFS file executes properly and/or without errors, then the updated FFS file may be added to a launch list. If, however, the updated FFS file does not execute properly, then the updated FFS file may be added to a black list. On subsequent booting of the computer system, a particular FFS file update may be executed if that FFS update is indicated on the launch list. Alternatively, if the FFS update is indicated in the black list, then the original FFS file may be executed instead of the updated version of the FFS file.

While the subject matter described herein is presented in the general context of program modules, firmware components, and firmware file system (FFS) files that execute in conjunction with booting up a computer system and/or the execution of an operating system and application programs on a computer system, those skilled in the art will recognize that other implementations can be performed in combination with other types of program modules, firmware components, and FFS files.

Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, minicomputers, mainframe computers, and the like.

The subject matter described herein can be practiced in a distributed computing environment where tasks are performed by remote processing devices that are linked through a communications network, and wherein program modules may be located in both local and remote memory storage devices. It should be appreciated, however, that the implementations described herein can also be utilized in conjunction with stand-alone computer systems and other types of computing devices. It should also be appreciated that the embodiments presented herein can be utilized with any type of local area network (LAN) or wide area network (WAN).

In the following detailed description, references are made to the accompanying drawings that form a part hereof, and which are shown by way of illustration specific embodiments or examples. Referring now to the drawings, in which like numerals represent like elements through the several FIGURES, aspects of a computing system and methodology for updating FFS files will be described.

FIG. 1 is a block diagram showing example computer system 100 with a firmware 120 with an update firmware volume 128 for storing updated firmware file system (FFS) files 140(1), 140(2), according to example embodiments of the disclosure. The firmware 120, and components thereof, may be stored on non-volatile random access memory (NVRAM) 110, or any other suitable non-volatile memory or storage.

The firmware 120 may be of any suitable type including, but not limited to, basic input/output system (BIOS), extensible firmware interface (EFI), universal extensible firmware interface (UEFI), Open Firmware, combinations thereof, or the like. The firmware 120 and the functionality thereof may be incorporated as part of any suitable computing system 100 including, but not limited to, servers, desktop computers, laptop computers, netbook computers, set-top-boxes, gaming consoles, Wi-Fi routers, smartphones, wearable computers, smart appliances, home automation/control systems, vehicle infotainment systems, combinations thereof, or the like. The firmware 120 and/or components thereof may enable boot-up services and/or runtime services for the computing system 100. As a nonlimiting example, the firmware 120 may be manufactured by PHOENIX TECHNOLOGIES, AMERICAN MEGATRENDS, or any other suitable manufacturer of firmware.

According to example embodiments of the disclosure, the computer system 100 may include one or more processors, such as a central processing unit (CPU) 102. The CPU 102 may be communicatively coupled to the NVRAM 110 and configured to access the firmware 120 provided thereon, such as via a system bus. The CPU 102 may be configured to access and/or execute data and/or instructions found in the firmware 120, such as data and/or instructions stored in various firmware volumes, such as boot block firmware volume (fv_bb) 122, main firmware volume (fv_main) 124, NVRAM variable firmware volume (fv_NVRAM) 126, update firmware volume (fv_update) 128, or the like, within various components of the firmware 120, to perform various boot-up or runtime services.

Example CPU 102 and/or processors may be with any suitable type of one or more processors including, but not limited to INTEL ARCHITECTURE (IA) processors from INTEL CORP., processors from ADVANCED MICRO DEVICES (AMD), POWERPC/POWER ARCHITECTURE processors and/or microcontrollers, ARM PROCESSORS, processors and/or microcontrollers from FUJITSU, ST MICROELECTRONICS, FREESCALE SEMICONDUCTOR, INTERNATIONAL BUSINESS MACHINES (IBM), TEXAS INSTRUMENTS, QUALCOMM, BROADCOM, SAMSUNG, ORACLE CORP./SUN MICROSYSTEMS, any variety of single-core processors, any variety of multi-core processors, microcontrollers, embedded processors, combinations thereof, or the like.

Each of the firmware volumes 122, 124, 126, 128 may contain firmware file system (FFS) files therein. The FFS files may include instructions and/or computer code that may be executed by the CPU to execute firmware functions, such as boot-up operations. For example, as depicted, original FFS files 130(1), . . . , 130(N), hereinafter referred to individually or collectively as original FFS files 130, may be stored in fv_main 124 associated with a corresponding identifier, such as a corresponding globally unique identifier (GUID). The original FFS files 130 may be FFS files, as initially stored when providing the firmware 120 on the NVRAM 110, such as during build-time of the computer system 100, such as by a manufacturer of the computer system 100. There may be any suitable number and/or type of original FFS files 130. Additionally, the original FFS files may be stored in fv_main 124, or any other suitable location, such as fv_bb 122, or other firmware volumes that may not be depicted in the example firmware 120 of FIG. 1.

In some cases, the original FFS files 130 may include executable instructions (e.g., computer code) that may be executed by the CPU 102, to perform various operations of the computer system 100 during boot-up of the computer system 100. For example, the original FFS files 130 may include any suitable executable code, such as device drivers that are executed by the CPU 102 during a driver execution environment (DXE) phase of the computer system 100 boot-up. The original FFS files 130, as initially provided on the computer system 100, may include instructions to properly configure the computer system 100 and its peripherals during boot-up.

According to example embodiments of the disclosure, updated FFS files 140(1), 140(2), hereinafter referred to individually or collectively as updated FFS files 140, may be stored in fv_update 128. The updated FFS files 140 may include updates to one or more of the original FFS files 130. There may be any suitable number of updated FFS files 140, and are not limited to the two updated FFS files depicted in FIG. 1. As a non-limiting example, as depicted in FIG. 1, original FFS file #2 130(2) and original FFS file #3 130(3) are shown as updated with updated FFS file #2 140(1) and updated FFS file #2 140(2), respectively. It will be appreciated that there may be any number of original FFS files 140 that may be updated.

The updated FFS files 140 may be stored in the fv_update 128 volume associated with the FFS file identifier of the corresponding original FFS file 130. For example, the updated FFS file #2 140(1) may be stored in fv_update 128 associated with the same identifier, GUID #2, as the original FFS file #2 130(2).

When the system 100 boots up, in some example embodiments, the CPU 102 may see that there are updated FFS files 140 corresponding to each of the original FFS file #2 130(2) and the original FFS file #3 130(3), and as a result, the CPU 102 may execute the updated FFS file #2 140(1) and the updated FFS file #2 140(2), instead of the original FFS file #2 130(2) and the original FFS file #3 130(3), respectively. The CPU 102 may identify that there are updates to the original FFS file #2 130(2) and the original FFS file #3 130(3) by determining that there are updated FFS files 140 stored in fv_update 128 that are associated with GUID #2 and GUID #3.

In some example embodiments, the CPU 102 may only launch an updated FFS file 140 for use during boot-up only if that file has proven to not generate errors during boot-up and/or does not render the computer system 100 inoperable. When an updated FFS file 140 is first executed, the CPU 102 may identify if the execution thereof generates any errors, and based at least in part thereon, indicate the updated FFS file to either be launched or blocked for subsequent booting of the computer system 100.

According to example embodiments, after the first execution of an updated FFS file 140 for the first time, the CPU 102 may include an indication (e.g., the corresponding GUID or other identifier) of the updated FFS file on a black list 150, if that updated FFS file 140 is to be blocked for future use. Similarly, after the first execution of the updated FFS file 140 for the first time, the CPU 102 may include an indication (e.g., the corresponding GUID or other identifier) of the updated FFS file on a launch list 152, if that updated FFS file 140 is to be launched in future boot-ups of the computer system 100.

Thus, in those embodiments where only a known good FFS file is launched for subsequent use during boot-up, when the computer system 100 commences a boot-up and identifies that an updated FFS file 140 exists in fv_update 128, the CPU 102 may check the launch list 152 to determine if the updated FFS file 140 is to be executed. In other words, if the GUID of the updated FFS file 140 is included in the launch list 152, then the CPU 102 may execute the instructions of the updated FFS file 140, rather than its original FFS file 130 counterpart.

Figure 2:
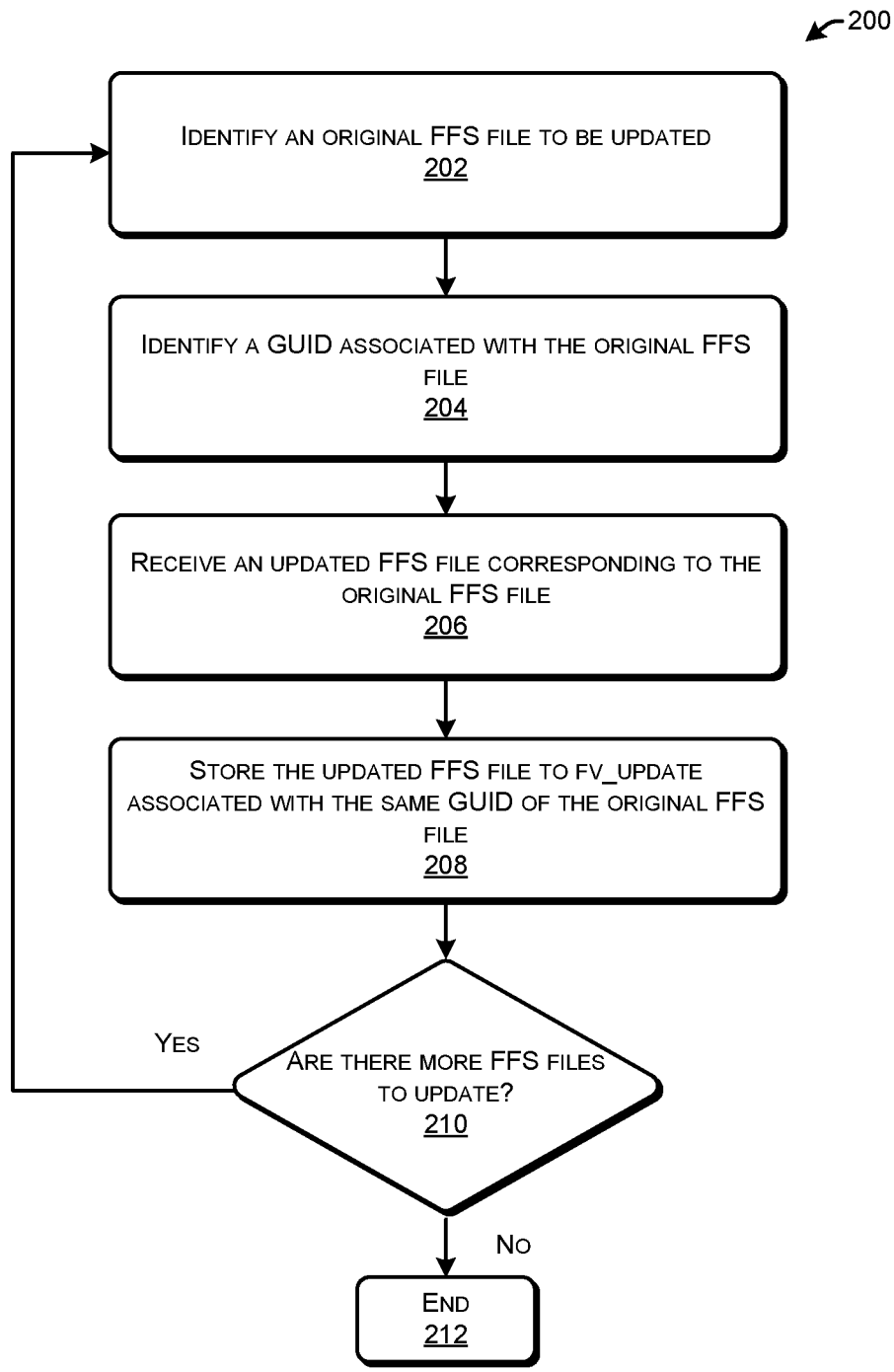
FIG. 2 is a flow diagram illustrating an example method for updating FFS files, according to example embodiments of the disclosure.

FIG. 2 is a flow diagram illustrating an example method 200 for updating FFS files, according to example embodiments of the disclosure. The method 200 may be performed on one or more processors, such as the CPU 102, associated with a system 100 incorporating firmware 120, as described herein. The performance of method 200 may be enabled by instructions of any one, or combination of, the firmware 120, an O/S, and/or one or more application programs operating during runtime (e.g., after boot-up and under the control of an O/S) on the CPU 102. In some cases, this method 200 may be performed by a firmware update utility operating on the computer system 100.

At block 202, an FFS file to be updated may be identified. This original FFS file 130 may be identified by any variety of suitable mechanism, such as by way of a message that indicates that a particular original FFS file 130 that is to be updated. Alternatively, the original FFS file 130 to be updated may be identified by way of a user input, such as an input via an application program for managing firmware updates.

At block 204, a globally unique identifier (GUID) associated with the original FFS file 130 to be updated may be identified. In example embodiments, an identifier other than the GUID associated with the original FFS file 130 to be updated may be identified. For example, instead of a GUID, a FFS file name may be used to identify the original FFS file 130 to be updated.

At block 206, an updated FFS file 140 may be received. This file may be uploaded, such as from a peripheral device, or received via a network connection, or indeed received in any suitable manner.

At block 208, the updated FFS file 140 may be stored in fv_update 128 associated with the GUID of the original FFS file 130. Once saved in fv_update 128, the updated FFS file 140 may be accessed by the CPU 102, such as during a boot-up of the computer system 100.

At block 210, it may be determined if there are any more FFS files to update. If there are no more FFS files to update, then at block 212, the method 200 may end. Otherwise, the method 200 may return to block 202 to identify the next FFS file that is to be updated.

Figure 3:
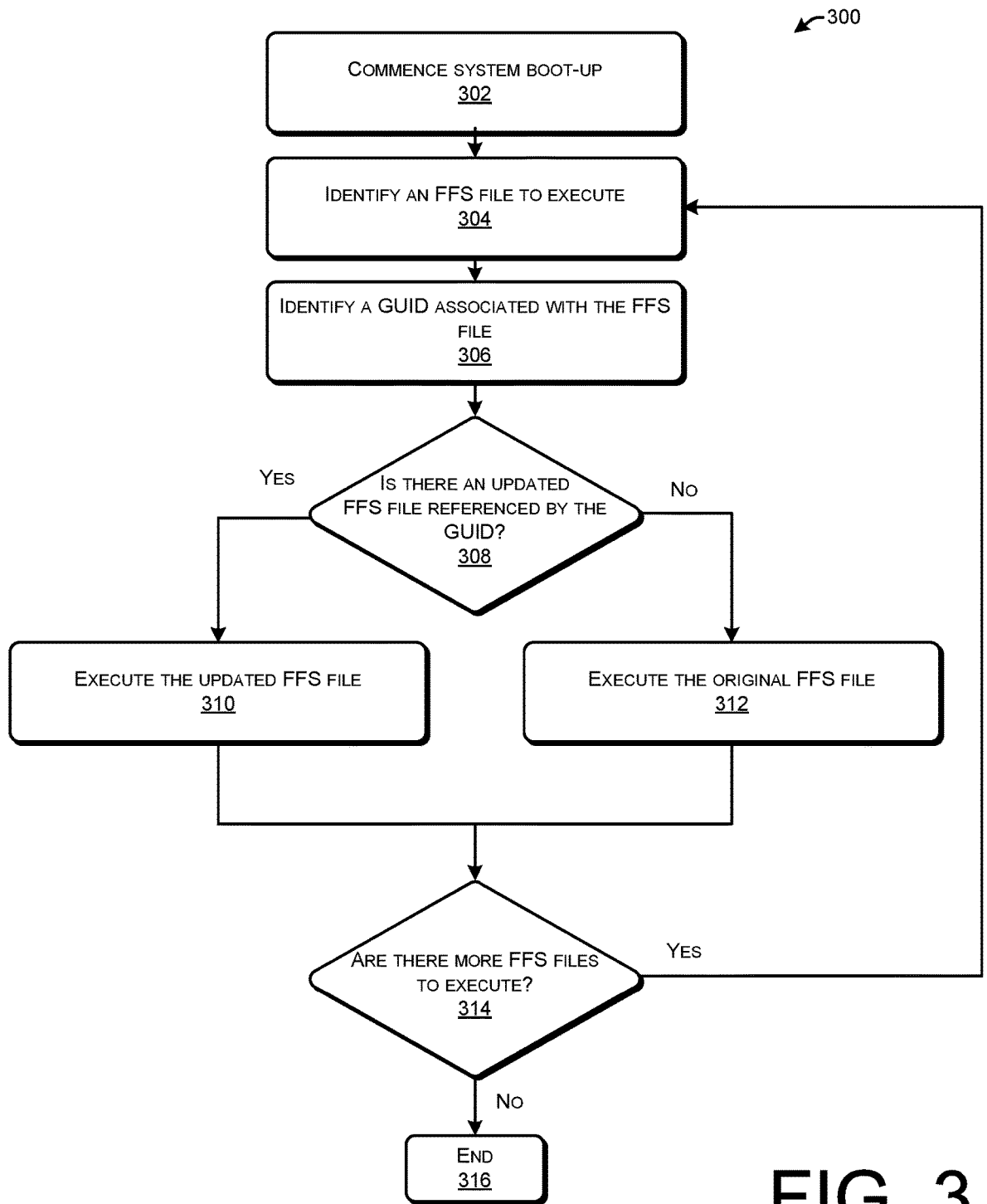
FIG. 3 is flow diagram illustrating an example method for executing an updated FFS file during a computer system bootup, according to example embodiments of the disclosure.

FIG. 3 is flow diagram illustrating an example method 300 for executing an updated FFS file during a computer system 100 bootup, according to example embodiments of the disclosure. The method 300 may be performed on one or more processors, such as the CPU 102 associated with the computer system 100 incorporating firmware 120, as described herein.

At block 302, system boot-up may commence. The boot-up of the computer system 100 may be enabled by the instruction codes of the firmware 120, as executed by the CPU 102. The CPU 102 may perform a variety of functions to enable boot-up the computing system 100 in which the firmware 120 is incorporated. These functions may include, for example, a driver execution environment (DXE) phase where one or more drivers may be launched to configure various peripherals of the computer system 100. These drivers, and other executable code may be provided in fv_bb 122, fv_main 124, and/or fv_update 128 as FFS files.

At block 304, an FFS file to execute may be identified. This FFS file may be an original FFS file 130, as stored in, for example fv_main 124. At block 306, a GUID associated with the FFS file to execute may be identified. Alternatively, any other suitable identifier of the original FFS file 130 may be identified.

At block 308, it may be determined if there is an updated FFS file 140 referenced by the GUID, or any other suitable identifier of FFS files. This may be determined by accessing fv_update 128 to check if an updated FFS file 140 is stored therein associated with the GUID. If an updated FFS file 140 corresponding to the GUID is found, then that updated FFS file 140 may be executed at block 310. If, however, at block 308, it is determined that an updated FFS file 140 corresponding to the GUID is not available, then at block 312, the original FFS file 130 as identified in the operations of block 304 may be executed.

At block 314, it may be determined if there are more FFS files to execute. If there are more FFS files to execute, then the method 300 may return to block 304 to identify the next FFS file to execute. If, on the other hand, at block 304 it is determined that there are no more FFs files to execute, then the method 300 may end at block 316.

Figure 4:
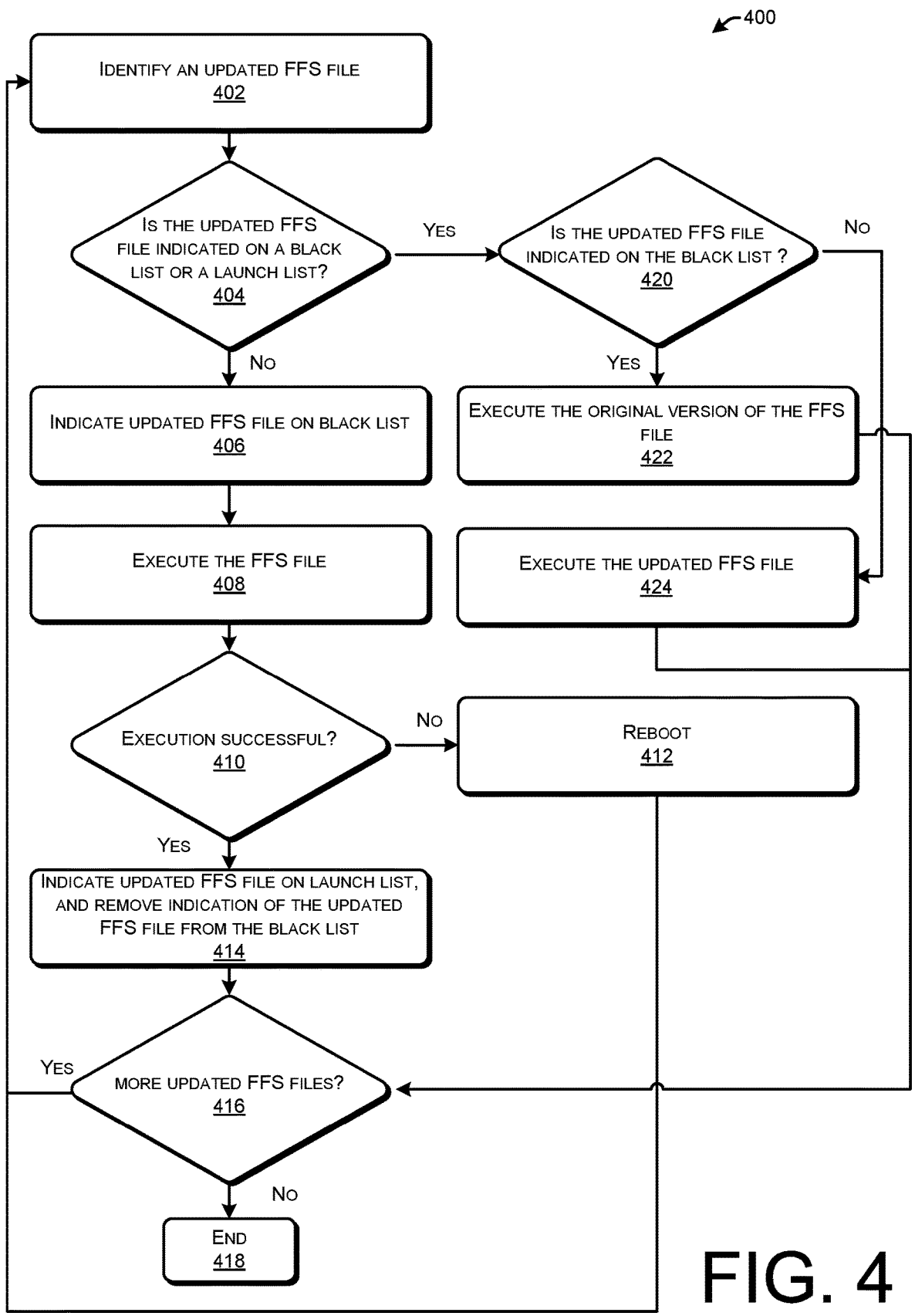
FIG. 4 is flow diagram illustrating an example method for a computer system bootup after an update of at least one FFS file, according to example embodiments of the disclosure.

FIG. 4 is flow diagram illustrating an example method for a computer system bootup after an update of at least one FFS file, according to example embodiments of the disclosure. The method 300 may be performed on one or more processors, such as the CPU 102 associated with the computer system 100 incorporating firmware 120, as described herein.

At block 402, an updated FFS file may be identified. This updated driver may be discovered using various operations as described with conjunction with FIG. 3. The updated FFS file may, for example, be identified in fv_update as stored with a GUID that is the same as the GUID of a factory, or original, version of the FFS file.

At block 404, it may be determined if the updated FFS 140 is indicated on a black list 150 or a launch list 152. In example embodiments, the updated FFS file 140 may be indicated in either the black list 150 or the launch list 152, by inclusion of the GUID corresponding to the updated FFS file 140 on either the black list 150 or the launch list 152. In some cases, the black list 150 and/or the launch list 152 may be stored on the NVRAM 110, and the CPU 102 may retrieve the black list 150 and/or the launch list 152 from the NVRAM 110 to determine if the updated FFS file is indicated in either list 150, 152. If the black list 150 and/or the launch list 152 are stored at a location other than the NVRAM 110, then the block list 150 and/or launch list 152 may be retrieved by the CPU 102 from that alternated datastore.

If the computer system 100 is being rebooted for the first time after a firmware update, then the updated FFS file may not be indicated in either the black list 150 and/or the launch list 152. In other words, if the updated FFS file had never been launched or executed, then it may not be identified on either the black list 150 or the launch list 152.

If it is determined that the updated FFS file is not on either the black list 150 or the launch list 152, then at block 406, an indication of the updated FFS file may be added to the black list 150. This may entail adding the GUID, or any other suitable identifier of the updated FFS file, to the black list 150.

At block 408, the FFS file may be executed. This may entail the CPU 102 performing operations according to the computer code of the updated FFS file. At block 410, it may be determined if the execution of the updated FFS file 140 was successful. In other words, it may be determined if the updated FFS file 140 executed in an error free manner. Error free execution may be identified as code execution that does not adversely affect any other system data and/or the operations and/or configurations set by other FFS files. For example, if the updated FFS file 140 is an updated driver to be executed during a driver execution environment (DXE) phase of the computer system 100 boot-up process, then an error may be detected if the updated driver does not properly execute and/or does not properly configured peripherals of the computer system 100.

If it is determined that the updated FFS file did not successfully execute, then at block 412, the computer system 100 may reboot. In example embodiments, it may be determined that the FFS file did not successfully execute using a watchdog timer (WDT). In other words, the computer system 100 may reboot when the WDT times out. In this case, the updated FFS file 140 remains indicated in the black list 150, such that the updated FFS file 140 will not be executed in future reboots of the computer system 100, but rather the original (e.g., factory version) FFS file 130 may be executed.

The method 400 may then return to block 402 to identify additional updated FFS files 140 during the reboot of the computer system 100.

If, however, at block 410, it is determined that the execution for the updated FFS file 140 was successful, then at block 414, the updated FFS file may be indicated in the launch list 152 and the indication of the updated FFS file may be removed from the black list 150. In other words, the GUID of the updated FFS file 140 may be removed from the black list 150 and added to the launch list 152. At block 416, it may be determined if there are additional undated FFS files 140. If there are additional updated FFS files 140, then the method 400 may return to block 402 to identify the next updated FFS file 140. If on the other hand, there are no additional updated FFS files, then the method 400 may end at block 418.

If at block 404, it was determined that the updated FFS file was indicated on either the black list 150 or the launch list 152, then the method 400 may proceed to block 420, where it may be determined if the updated FFS file is indicated on the black list 150. If the updated FFS file 140 is indicated on the black list 150, then at block 422, the original FFS file 130, such as the factory installed version, may be executed. The method 400 may then proceed to block 416 to identify whether there are additional updated FFS files 140.

If at block 420, it is determined that the updated FFS file 140 is not indicated on the black list 150, then the updated FFS file 140 is indicated on the launch list 152. As a result, at block 424, the updated FFS file 140 may be executed. The method 400 may then proceed to block 416 to identify whether there are additional updated FFS files 140.

Although the methods 200, 300, and 400 are described with reference to the flow diagram illustrated in FIGS. 2-4, many other operations for performing the acts associated with the methods 200, 300, and 400 may be used. For example, the order of the operations may be changed, some of the operations described may be optional, and additional operations may be included, in accordance with example embodiments of the disclosure.

Figure 5:
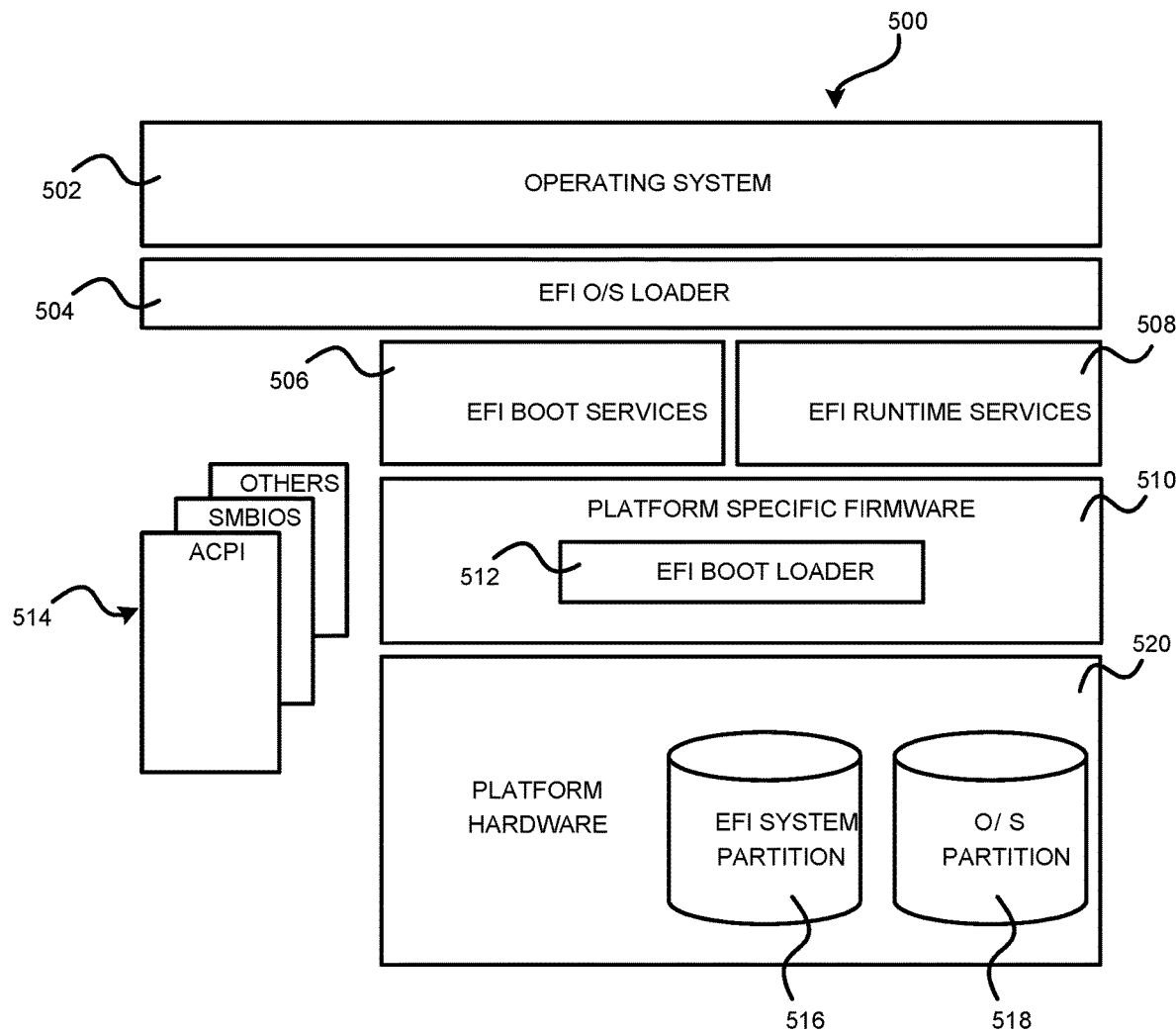
FIG. 5 is a software architecture diagram illustrating a software architecture for a unified extensible firmware interface (UEFI) Specification-compliant firmware that provides an operating environment, according to example embodiments of the disclosure.

Turning now to FIG. 5, a software architecture diagram is described that illustrates an architecture for a UEFI Specification-compliant firmware that implement aspects of the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The operating system (O/S) image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface (ACPI) and the System Management BIOS (SMBIOS) specifications can be supported.

UEFI boot services 506 can provide interfaces for devices and system functionality used during boot time. UEFI runtime services 508 can also be available to the UEFI OS loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
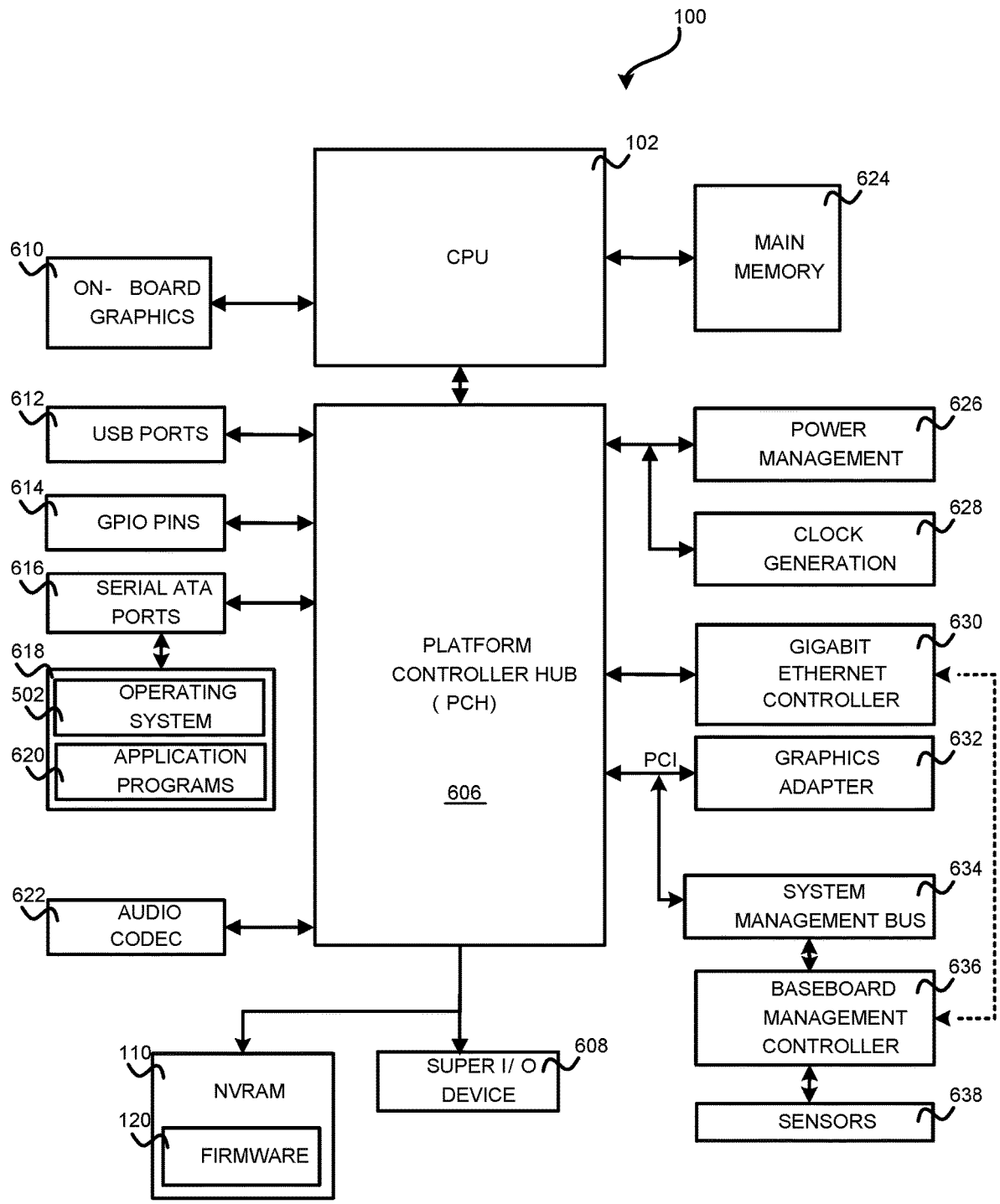
FIG. 6 is a computer architecture diagram that shows an illustrative architecture for a computer that can provide an operating environment for the technologies disclosed herein, according to example embodiments of the disclosure.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 100 that can be utilized in the implementations described herein. The illustrative computer architecture shown in FIG. 6 is for the computer 100 that includes a baseboard, or "motherboard," which is a printed circuit board to which a multitude of components or devices can be connected by way of a system bus or other electrical communication path. In one illustrative configuration, the central processing unit (CPU) 102 operates in conjunction with a Platform Controller Hub (PCH) 606. The CPU 102 is a central processor that performs arithmetic and logical operations necessary for the operation of the computer 100. The computer 100 can include a multitude of CPUs 102. Each CPU 102 might include multiple processing cores.

The CPU 102 provides an interface to a random access memory (RAM) used as the main memory 624 in the computer 100 and, possibly, to an on-board graphics adapter 632. The PCH 606 provides an interface between the CPU 102 and the remainder of the computer 100.

The PCH 606 can also be responsible for controlling many of the input/output functions of the computer 100. In particular, the PCH 606 can provide one or more universal serial bus ("USB") ports 612, an audio codec 622, a Gigabit Ethernet Controller 630, and one or more general purpose input/output (GPIO) pins 614. The USB ports 612 can include USB 2.0 ports, USB 3.0 ports and USB 3.1 ports among other USB ports. The audio codec 622 can include Intel High Definition Audio, Audio Codec '97 (AC'97) and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect (PCI) bus, a Peripheral Component Interconnect eXtended (PCI-X) bus and a Peripheral Component Interconnect Express (PCIe) bus among others.

The PCH 606 can also provide a system management bus 634 for use in managing the various components of the computer 100. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment (SATA) adapter for providing one or more serial ATA ports 616. The serial ATA ports 616 can be connected to one or more mass storage devices storing an O/S, such as O/S 502 and application programs, such as a SATA disk drive 618. As known to those skilled in the art, an O/S comprises a set of programs that control operations of a computer and allocation of resources. An application program is software that runs on top of the operating system software 502, or other runtime environment, and uses computer resources to perform application specific tasks desired by the user.

According to one configuration, the O/S 502 comprises the LINUX operating system. According to another configuration, the O/S 502 comprises the WINDOWS operating system from MICROSOFT CORPORATION. According to another configuration, the O/S 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 100.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 100.

A low pin count (LPC) interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as the NVRAM 110 for storing firmware 604 that includes program code containing the basic routines that help to start up the computer 100 and to transfer information between elements within the computer 100. The firmware 120 can be a multi-platform firmware, such as that contained in the multi-platform firmware image 112.

It should be appreciated that the program modules disclosed herein, including the firmware 120, can include software instructions that, when loaded into the CPU 102 and executed, transform a general-purpose computer 100 into a special-purpose computer 100 customized to facilitate all, or part of, the operations disclosed herein. As detailed throughout this description, the program modules can provide various tools or techniques by which the computer 100 can participate within the overall systems or operating environments using the components, logic flows, and/or data structures discussed herein.

The CPU 102 can be constructed from any number of transistors or other circuit elements, which can individually or collectively assume any number of states. More specifically, the CPU 102 can operate as a state machine or finite-state machine. Such a machine can be transformed to a second machine, or a specific machine, by loading executable instructions contained within the program modules. These computer-executable instructions can transform the CPU 102 by specifying how the CPU 102 transitions between states, thereby transforming the transistors or other circuit elements constituting the CPU 102 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 110. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller (BMC) 636. In general, the BMC 636 is a microcontroller that monitors operation of the computer 100. In a more specific configuration, the BMC 636 monitors health-related aspects associated with the computer 100, such as, but not limited to, the temperature of one or more components of the computer 100, speed of rotational components (e.g., spindle motor, CPU fan, etc.) within the computer 100, the voltage across or applied to one or more components within the computer 100, and the available and/or used capacity of memory devices within the computer 100. To accomplish these monitoring functions, the BMC 636 is communicatively connected to one or more components by way of the system management bus 634.

In one configuration, these components include sensor devices 638 for measuring various operating and performance-related parameters within the computer 100. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 100 can be provided by other types of computing devices, including hand-held computers, embedded computer systems, personal digital assistants, and other types of computing devices known to those skilled in the art. It is also contemplated that the computer 100 might not include all of the components shown in FIG. 6, can include other components that are not explicitly shown in FIG. 6, or might utilize an architecture completely different than that shown in FIG. 6.

Based on the foregoing, it should be appreciated that technologies for updating firmware have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method for updating firmware file system (FFS) file, the method comprising:
   identifying, by one or more processors, a first FFS file during boot-up of a computing system, the first FFS file being stored in a first firmware volume within a non-volatile memory included in the computing system;
   identifying, by the one or more processors, during the boot-up of the computing system, a first identifier that identifies the first FFS file;
   determining, by the one or more processors, during the boot-up of the computing system, that a second FFS file is identified by the first identifier and is stored in a second firmware volume within the non-volatile memory, wherein the second firmware volume being separate from the first firmware volume, and the second FFS file is an updated version of the first FFS file;
   determining, by the one or more processors, using a launch list and the first identifier, that the second FFS file is to be launched during boot-up of the computing system, wherein the launch list identifies whether a updated version of a particular FFS file is allowed to be executed when the updated version of the particular FFS file is detected; and
   executing, by the one or more processors, based at least in part on the determining that the second FFS file is identified by the first identifier and the launch list identifies the second FFS file is allowed to be executed, instructions contained in the second FFS file during the boot-up of the computing system.

2. The method of claim 1, wherein the first identifier is a globally unique identifier (GUID).

3. The method of claim 1, wherein the first FFS file is a device driver and the second FFS file is an updated version of the device driver.

4. The method of claim 1, further comprising:
   identifying, by one or more processors, a third FFS file stored in the first firmware volume;
   identifying, by the one or more processors, a second identifier associated with the third FFS file;

determining, by the one or more processors, that no FFS files associated with the second identifier are stored in the second firmware volume; and executing, by the one or more processors and based at least in part on the determining that no FFS files associated with the second identifier are stored in the second firmware volume, instructions of the third FFS file.

5. The method of claim 1, further comprising:

determining, by the one or more processors, that a third FFS file stored in the first firmware volume and associated with a second identifier is to be updated with a fourth FFS file;

receiving the fourth FFS file; and storing, by the one or more processors, the fourth FFS file associated with the second identifier in the second firmware volume.

6. An apparatus for updating firmware file system (FFS) file, the apparatus comprising:

at least one processor; and a computer-readable non-volatile memory, having instructions stored thereon that are executed by the at least one processor to:

identify a first FFS file and a first identifier corresponding to the first FFS file during boot-up of a computing system, the first FFS file being stored in a first firmware volume within a non-volatile memory of the computing system;

determine, during the boot-up of the computing system, a second FFS file stored in a second firmware volume within the non-volatile memory, the second FFS file being identified by the first identifier, wherein the second firmware volume being separate from the first firmware volume, and the second FFS file is an updated version of the first FFS file;

determine, using a launch list and the first identifier, that the second FFS file is to be launched during the boot-up of the computing system, wherein the launch list identifies whether a updated version of a particular FFS file is allowed to be executed when the updated version of the particular FFS file is detected; and execute, based at least in part on determining the second FFS file is identified by the first identifier and the launch list identifies the second FFS file is allowed to be executed, second instructions contained in the second FFS file during the boot-up of the computing system.

7. The apparatus of claim 6, wherein the second firmware volume includes a plurality of updated FFS files, the updated FFS files including the second FFS file.

8. The apparatus of claim 7, wherein the computer-readable non-volatile memory has further instructions stored thereon that are executed by the at least one processor to:

determine, based at least in part on the determining that the second FFS file is associated with the first identifier, that the first instructions are not to be executed, wherein executing the second instructions is based at least in part on determining that the first instructions are not to be executed.

9. The apparatus of claim 6, wherein the first identifier is a globally unique identifier (GUID).

10. The apparatus of claim 6, wherein the first FFS file is a device driver and the second FFS file is an updated version of the device driver.

11. The apparatus of claim 6, wherein the computer-readable non-volatile memory has further instructions stored thereon that are executed by the at least one processor to:

identify a third FFS file, stored in the first firmware volume;

identify a second identifier associated with the third FFS file;

determine that no FFS files associated with the second identifier are stored in the second firmware volume; and execute, based at least in part on the determining that no FFS files associated with the second identifier are stored in the second firmware volume, instructions contained in the third FFS file.

12. The apparatus of claim 6, wherein the computer-readable non-volatile memory has further instructions stored thereon that are executed by the at least one processor to:

determine that a third FFS file stored in the first firmware volume and associated with a second identifier is to be updated with a fourth FFS file;

receive the fourth FFS file; and store the fourth FFS file associated with the second identifier in the second firmware volume.

13. A non-transitory computer-readable storage medium having instructions stored for updating firmware file system (FFS) file, the instructions thereupon which, when executed by a processor, cause the processor to:

identify, during boot-up of a computing system, a first FFS file stored in a first firmware volume within a non-volatile memory included in the computing system;

identify, during the boot-up of the computing system, a first identifier that identifies the first FFS file;

determine, during the boot-up of the computing system, a second FFS files corresponding to the first identifier are stored in a second firmware volume within the non-volatile memory, wherein the second firmware volume being separate from the first firmware volume, and the second FFS file is an updated version of the first FFS file;

determine, using a launch list and the first identifier, that the second FFS file is not allowed to be launched during boot-up of the computing system, wherein the launch list identifies whether a updated version of a particular FFS file is allowed to be executed when the updated version of the particular FFS file is detected; and execute, based at least in part on determining that the second FFS files corresponding to the first identifier and the launch list identifies the second FFS file is not allowed to be executed, instructions contained in the first FFS file during boot-up of a computing system that includes the non-volatile memory.

14. The non-transitory computer-readable storage medium of claim 13, wherein the first identifier is a globally unique identifier (GUID).

15. The non-transitory computer-readable storage medium of claim 13, having further computer-readable instructions stored thereupon which, when executed by the processor, cause the processor to:

identify a third FFS file stored in the first firmware volume;

identify a second identifier associated with the third FFS file;

determine that no FFS file associated with the second identifier is stored in the second firmware volume; and execute, based at least in part on the determining that no FFS file is associated with the second identifier is stored in the second firmware volume, instructions contained in the third FFS file.

16. The non-transitory computer-readable storage medium of claim 15, wherein the second FFS file is a device driver and the third FFS file is an updated version of the device driver.

17. The non-transitory computer-readable storage medium of claim 15, having further computer-readable instructions stored thereupon which, when executed by the processor, cause the processor to:
- determine, based at least in part on the determining that the third FFS file is associated with the second identifier, that the second FFS file is not to be executed,
- wherein executing the third FFS file is based at least in part on determining that instructions contained in the second FFS file is not to be executed.

18. The non-transitory computer-readable storage medium of claim 15, wherein the second firmware volume has a plurality of updated FFS files stored therein, the plurality of updated FFS files including a fourth FFS file.

19. The non-transitory computer-readable storage medium of claim 13, having further computer-readable instructions stored thereupon to:
- determine that a third FFS file stored in the first firmware volume and associated with a second identifier is to be updated with a fourth FFS file;
- receive the fourth FFS file; and
- store the fourth FFS file associated with the second identifier in the second firmware volume.

* * * * *

UNITED STATES PATENT AND TRADEMARK OFFICE
CERTIFICATE OF CORRECTION

PATENT NO. : 10,684,843 B1  
APPLICATION NO. : 15/718862  
DATED : June 16, 2020  
INVENTOR(S) : Senthamizhsey Subramanian et al.

Page 1 of 1

It is certified that error appears in the above-identified patent and that said Letters Patent is hereby corrected as shown below:

On the Title Page

Item (72) Inventors, the inventor name "Sey Subramanian" should read "Senthamizhsey Subramanian".

Signed and Sealed this  
Twenty-fifth Day of August, 2020

Andrei Iancu  
*Director of the United States Patent and Trademark Office*